United States Patent
Lin et al.

(10) Patent No.: US 11,428,996 B2
(45) Date of Patent: Aug. 30, 2022

(54) DISPLAY DEVICE

(71) Applicant: Au Optronics Corporation, Hsinchu (TW)

(72) Inventors: Yi-Hsin Lin, Hsinchu (TW); Chao-Wei Huang, Hsinchu (TW); Chia-Hsuan Pai, Hsinchu (TW); Ya-Ling Hsu, Hsinchu (TW)

(73) Assignee: AU Optronics Corporation, Hsinchu (TW)

( * ) Notice: Subject to any disclaimer, the term of this patent is extended or adjusted under 35 U.S.C. 154(b) by 0 days.

(21) Appl. No.: 17/372,560

(22) Filed: Jul. 12, 2021

(65) Prior Publication Data

US 2022/0050318 A1 Feb. 17, 2022

Related U.S. Application Data

(60) Provisional application No. 63/065,641, filed on Aug. 14, 2020.

(30) Foreign Application Priority Data

Jan. 4, 2021 (TW) .................. 110100092

(51) Int. Cl.
*G02F 1/1339* (2006.01)
*G02F 1/1337* (2006.01)
(Continued)

(52) U.S. Cl.
CPC ........ *G02F 1/13394* (2013.01); *G02F 1/1337* (2013.01); *G02F 1/1339* (2013.01);
(Continued)

(58) Field of Classification Search
CPC .............. G02F 1/1345; G02F 1/13452; G02F 1/13458; G02F 1/13396; G02F 1/13398; G02F 1/1339; G02F 1/133345
See application file for complete search history.

(56) References Cited

U.S. PATENT DOCUMENTS

2017/0358602 A1* 12/2017 Bae ................. G02F 1/13458
2019/0243199 A1* 8/2019 Bae ................. G02F 1/136286
(Continued)

FOREIGN PATENT DOCUMENTS

CN 108363229 8/2018
CN 109856848 6/2019
(Continued)

*Primary Examiner* — Jessica M Merlin
(74) *Attorney, Agent, or Firm* — JCIPRNET (57) ABSTRACT

A display device includes a display panel, first and second conductive pads, a conductive adhesive layer and a circuit board. First and second leads are on a first substrate of the display panel and extended to be exposed at a side. A patterned electrode layer is on a second substrate of the display panel and partially exposed at the side. A spacer layer is on the first substrate and covers the first and second leads. A thickness of the spacer layer on the first lead is smaller than a thickness of the remaining part of the spacer layer. The first and second conductive pads are at the side of the display panel. The first conductive pads are extended to a space between the patterned electrode layer and the spacer layer on the first leads. The second conductive pads are connected to the second leads and the spacer layer thereon.

9 Claims, 12 Drawing Sheets (51) Int. Cl.
*G02F 1/1343* (2006.01)
*G02F 1/1345* (2006.01)

(52) U.S. Cl.
CPC ........ *G02F 1/1345* (2013.01); *G02F 1/13396* (2021.01); *G02F 1/13398* (2021.01); *G02F 1/13452* (2013.01); *G02F 1/134309* (2013.01)

(56) References Cited

U.S. PATENT DOCUMENTS

| | | | |
|---|---|---|---|
| 2019/0384089 A1* | 12/2019 | Jeon | G02F 1/13452 |
| 2020/0264468 A1* | 8/2020 | Park | H05K 1/147 |
| 2020/0292895 A1* | 9/2020 | Park | G02F 1/136286 |
| 2020/0312939 A1* | 10/2020 | Cheon | G02F 1/1345 |
| 2021/0055595 A1* | 2/2021 | Park | G02F 1/1303 |

FOREIGN PATENT DOCUMENTS

| | | |
|---|---|---|
| CN | 110568671 | 12/2019 |
| CN | 111221190 | 6/2020 |

\* cited by examiner

DISPLAY DEVICE

CROSS-REFERENCE TO RELATED APPLICATION

This application claims the priority benefit of U.S. provisional application Ser. No. 63/065,641, filed on Aug. 14, 2020, and Taiwan application serial no. 110100092, filed on Jan. 4, 2021. The entirety of each of the above-mentioned patent applications is hereby incorporated by reference herein and made a part of this specification.

BACKGROUND

Technical Field

The disclosure relates to a display device, and particularly relates to a display device with a side bonding external circuit board.

Description of Related Art

Current display device technology has been developed towards a trend of slim border panels. For example, a side bonding process may be applied to a display device to create a slim border. In the side bonding process of the display device, conductive pads are formed on a side of the display panel and a conductive adhesive is used to connect an external circuit board to the conductive pads, so that the external circuit board and the display panel are electrically connected by the conductive adhesive. Therefore, in the side bonding process, good electrical connection is often a topic in the field.

SUMMARY

The invention is directed to a display device, in which a part of a plurality of conductive pads extends to a space between two substrates, and a gap for accommodating the conductive pads is defined by a spacer layer arranged between the two substrates.

The invention provides a display device including a display panel having a central region and a periphery region, a plurality of first conductive pads, a plurality of second conductive pads, a conductive adhesive layer and an external circuit board. The display panel includes a first substrate and a second substrate arranged opposite to each other, a sealant and a spacer layer. A plurality of first leads and a plurality of second leads are disposed on the first substrate and extend to the periphery region, and are exposed at a side of the first substrate. A patterned electrode layer is disposed on the second substrate and is partially exposed at a side of the second substrate. The sealant is disposed between the first substrate and the second substrate. The spacer layer is disposed on the first substrate and located in the periphery region, and covers the first leads and the second leads, wherein a thickness of the spacer layer on the first leads is smaller than a thickness of a remaining part of the spacer layer. The first conductive pads are disposed at a side of the display panel, and connect the patterned electrode layer, the first leads, and the spacer layer on the first leads, wherein the first conductive pads extend to a space between the patterned electrode layer and the spacer layer on the first leads. The second conductive pads are disposed at the side of the display panel, and connect the second leads and the spacer layer on the second leads. The conductive adhesive layer is disposed at the side of the display panel and covers the first conductive pads and the second conductive pads. The external circuit board is arranged on the conductive adhesive layer.

Based on the above description, in the display device of the invention, a part of the plurality of conductive pads extends to a space between the two substrates, and the gap for accommodating the conductive pads is defined by the spacer layer disposed between the two substrates. In this way, a contact area between the conductive pads and the patterned electrode layer may be increased to ensure the electrical connection between the first leads and the patterned electrode layer.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings, but the provided examples are not used to limit the scope of the invention. In addition, the drawings are for illustrative purposes only, and are not drawn according to original dimensions. In order to facilitate understanding, the same elements will be described with the same symbols in the following description.

The terms "include", "include" and "have" mentioned in the specification are all open terms, which means "including but not limited to".

In addition, the directional terms such as "upper", "lower", "left", "right", etc., mentioned in the specification are only used to refer to directions of the drawings, and are not used to limit the invention.

When the terms "first", "second", etc., are used to describe elements, they are only used to distinguish these elements from each other, and do not limit an order or importance of these elements. Therefore, in some cases, a first element may also be referred to as a second element, and the second element may also be referred to as the first element, which does not deviate from a scope of the claims of the patent.

The display device of the invention includes a display panel, conductive pads (serving as side electrodes) arranged on a side of the display panel, an external circuit board arranged on the side of the display panel, and a conductive adhesive layer arranged between the external circuit board and the conductive pads. These components will be described in detail below.

Figure 1:
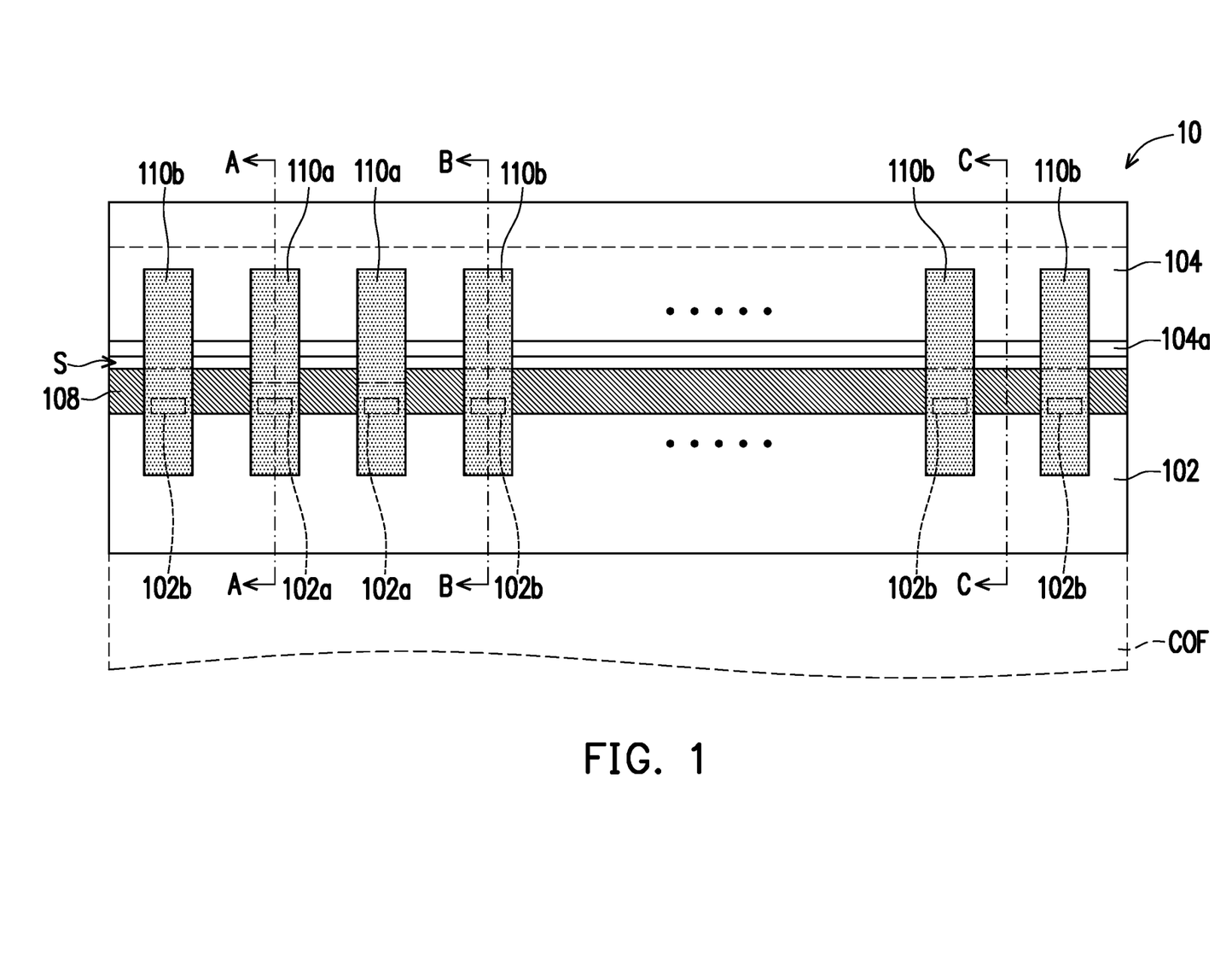
FIG. 1 is a schematic side view of a display panel according to an embodiment of the invention.
Figure 2A:
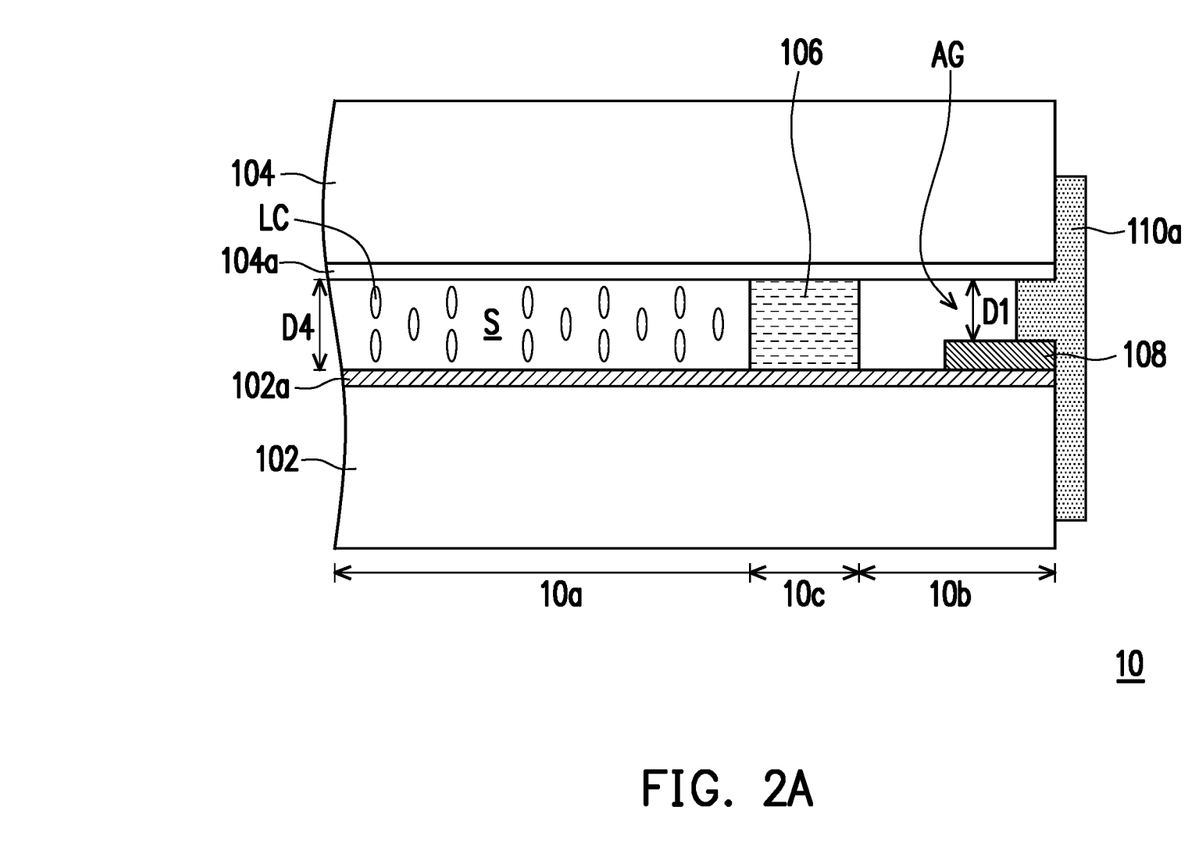
FIG. 2A is a schematic cross-sectional view of the display panel along a section line A-A in FIG. 1 according to an embodiment of the invention.
Figure 2B:
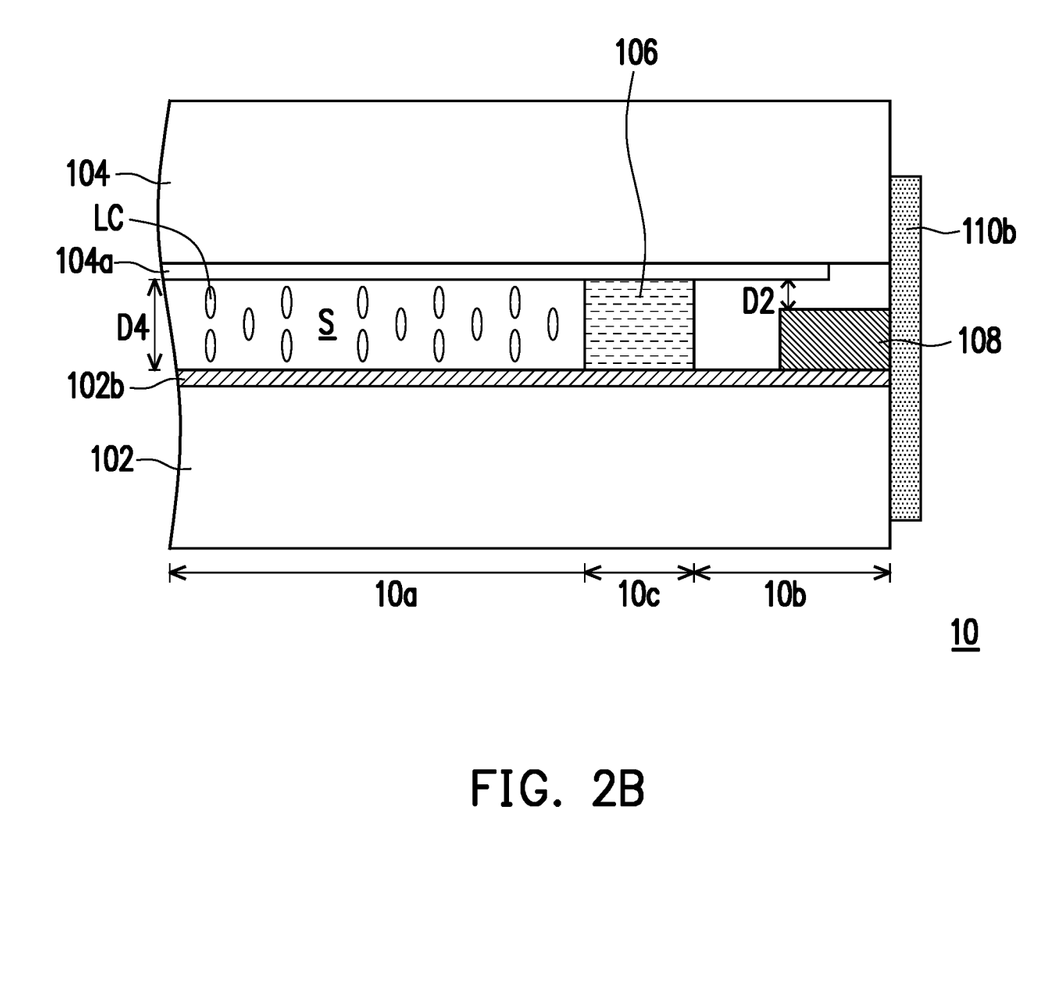
FIG. 2B is a schematic cross-sectional view of the display panel along a section line B-B in FIG. 1 according to an embodiment of the invention.
Figure 2C:
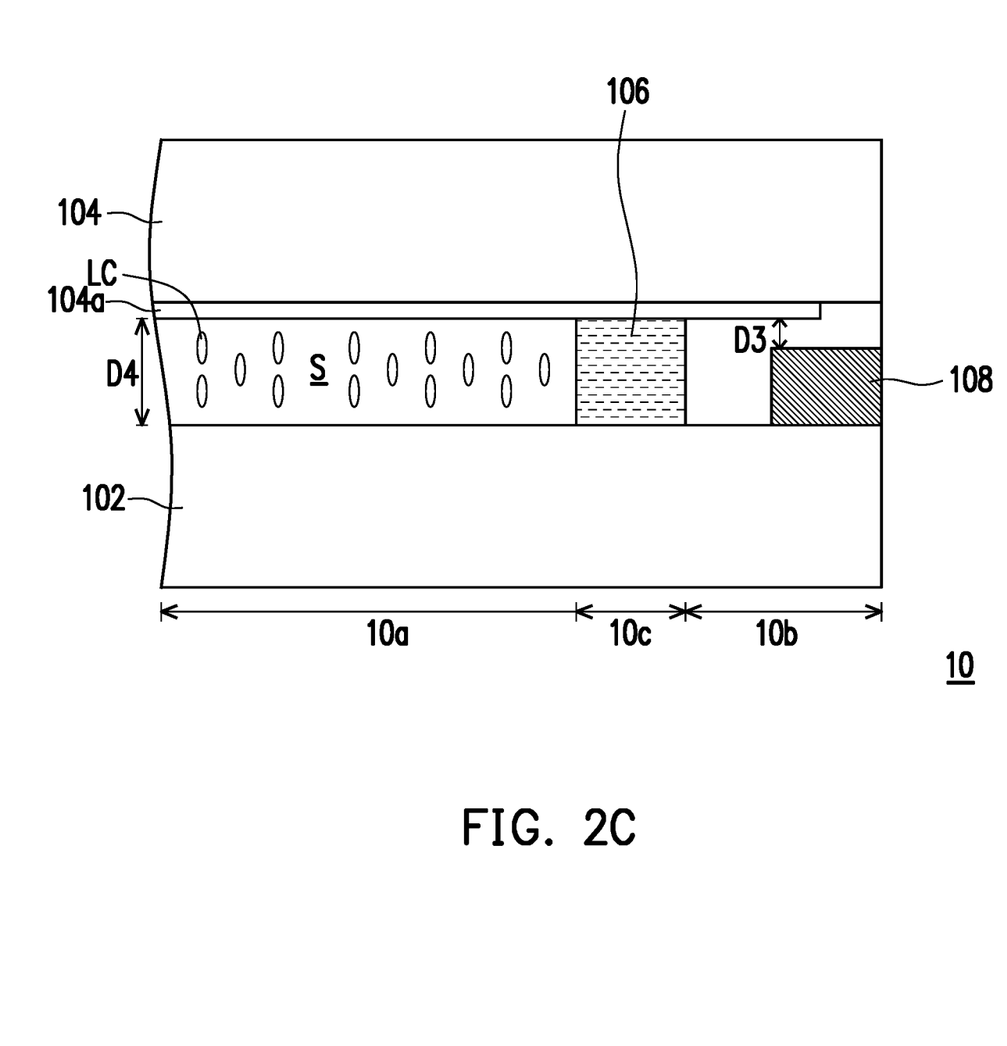
FIG. 2C is a schematic cross-sectional view of the display panel along a section line C-C in FIG. 1 according to an embodiment of the invention.

FIG. 1 is a schematic side view of a display panel according to an embodiment of the invention. FIG. 2A is a schematic cross-sectional view of the display panel along a section line A-A in FIG. 1 according to an embodiment of the invention. FIG. 2B is a schematic cross-sectional view of the display panel along a section line B-B in FIG. 1 according to an embodiment of the invention. FIG. 2C is a schematic cross-sectional view of the display panel along a section line C-C in FIG. 1 according to an embodiment of the invention. In the invention, the type of the display panel is not limited. For example, in the embodiment, the display panel includes two substrates arranged opposite to each other, but the invention is not limited thereto. In other embodiments, the display panel may also include only one substrate. In addition, in order to facilitate the description of the invention, FIG. 1, FIG. 2A, FIG. 2B, and FIG. 2C only briefly illustrate a thin-film transistor substrate constituting the display panel, leads provided on the thin-film transistor substrate, a color filter substrate, patterned electrodes provided on the color filter substrate, and a sealant used to bond the thin-film transistor substrate and the color filter substrate, but the invention is not limited thereto, and these components are well known to those skilled in the art, so that details thereof are not repeated. According to actual needs, those skilled in the art may make appropriate changes to the structure of the display panel of the embodiment. In addition, FIG. 1 illustrates a situation where an external circuit board COF is connected to the display panel, while in FIG. 2A, FIG. 2B and FIG. 2C, the external circuit board COF is omitted.

Referring to FIG. 1, FIG. 2A, FIG. 2B and FIG. 2C, in the embodiment, the display panel 10 includes a first substrate 102 and a second substrate 104 disposed opposite to each other, a sealant 106 for bonding the first substrate 102 and the second substrate 104, and a spacer layer 108 disposed on the first substrate 102. The display panel 10 has a central region 10a, a periphery region 10b, and a bonding region 10c. The periphery region 10b is a region adjacent to a side of the display panel 10, the central region 10a is a region surrounded by the periphery region 10b, and the bonding region 10c is a region where the sealant 106 is set and is located between the central region 10a and the periphery region 10b. The first substrate 102, the second substrate 104 and the sealant 106 define a space S. The space S is used for accommodating liquid crystal LC.

The first substrate 102 is, for example, a thin-film transistor substrate, which may have components such as active components, circuit patterns, leads, etc., where the leads extend from the inside of the first substrate 102 to a side and are exposed at the side to connect with external components. In FIG. 1, FIG. 2A, FIG. 2B and FIG. 2C, for simplicity's sake, only the leads are shown, and the remaining components are well known to those skilled in the art, and descriptions thereof are not repeated. In the embodiment, a plurality of first leads 102a and a plurality of second leads 102b are disposed on the first substrate 102 and extend into the periphery region 10b, and the invention does not limit the respective numbers and positions of the first leads 102a and the second leads 102b.

The second substrate 104 is, for example, a color filter substrate, which may have components such as a color filter, a black matrix (BM) pattern, a patterned electrode, etc., where the patterned electrode is disposed on the second substrate 104, and is partially exposed at the side of the second substrate 104 for connecting with the external components. In FIG. 1, FIG. 2A, FIG. 2B, and FIG. 2C, for simplicity's sake, only the patterned electrode is drawn, and the remaining components are well-known to those skilled in the art, and details thereof are not repeated. In the embodiment, the patterned electrode 104a is disposed on the second substrate 104 and is partially exposed at the side of the second substrate 104. In detail, in the embodiment, the first leads 102a need to be electrically connected to the patterned electrode 104a, and the second leads 102b does not need to be electrically connected to the patterned electrode 104a, so that only a part of the patterned electrode 104a located above the first leads 102a needs to extend to the side of the second substrate 104 and is exposed at the side, while the remaining part of the patterned electrode 104a does not need to extend to the side of the second substrate 104 to be exposed at the side.

As shown in FIG. 2A, since the first leads 102a needs to be electrically connected to the patterned electrode 104a, the part of the patterned electrode 104a located above the first leads 102a extends to the side of the second substrate 104 and is exposed at the side. As shown in FIG. 2B, since the second leads 102b does not need to be electrically connected to the patterned electrode 104a, the part of the patterned electrode 104a located above the second leads 102b does not extend to the side of the second substrate 104 to be exposed at the side. As shown in FIG. 2C, in a region between two adjacent leads (for example, the region between two adjacent first leads 102a, the region between two adjacent second leads 102b, the region between the adjacent first lead 102a and the second lead 102b), the patterned electrode 104a does not extend to the side of the second substrate 104 to be exposed at the side.

The spacer layer 108 is disposed on the first substrate 102 and located in the periphery region 10b. In addition, the spacer layer 108 covers the first leads 102a, the second leads 102b, and the first substrate 102 between two adjacent leads. The spacer layer 108 disposed on the first leads 102a and the second leads 102b may ensure the first leads 102a and the second leads 102b to be stably disposed on the first substrate 102. In the embodiment, an edge of the spacer layer 108 is aligned with an edge of the first substrate 102, but the invention is not limited thereto. In other embodiments, the edge of the spacer layer 108 may not be aligned with the edge of the first substrate 102, i.e., the edge of the spacer layer 108 may be retracted from the edge of the first substrate 102 toward the central region 10a. The spacer layer 108 is preferably an insulating layer, such as a polystyrene (PS) layer or a color photoresist layer, but the invention is not limited thereto.

In the embodiment, in different regions, the spacer layer 108 has different thicknesses. In detail, the thickness of the spacer layer 108 on the first leads 102a is smaller than the thickness of the remaining part of the spacer layer 108. As shown in FIG. 2A, FIG. 2B, and FIG. 2C, the thickness of the spacer layer 108 on the first leads 102a is smaller than the thickness of the spacer layer 108 on the second leads 102b, and smaller than the thickness of the spacer layer 108 located on the first substrate 102 between two adjacent leads. Moreover, in the embodiment, the thickness of the spacer layer 108 on the second leads 102b is less than or equal to the thickness of the spacer layer 108 located on the first substrate 102 between two adjacent leads.

In the periphery region 10b, there is an air gap AG between the first substrate 102 and the second substrate 104. In detail, in the embodiment, depending on the thicknesses of the spacer layer 108 in different regions, the air gap AG on the spacer layer 108 on the first leads 102a is defined by the spacer layer 108 and the patterned electrode layer 104a, and has a first distance D1, the air gap AG on the spacer layer 108 located on the second leads 102b is defined by the spacer layer 108 and the patterned electrode layer 104a and has a second distance D2, and the air gap AG on the spacer layer 108 located on the first substrate 102 between the first leads 102a and the second leads 102b is defined by the spacer layer 108 and the patterned electrode layer 104a and has a third distance D3. In addition, in the central region 10a, there is a fourth distance D4 from the first leads 102a and the second leads 102b to the patterned electrode layer 104a. In the embodiment, the fourth distance D4 is a height of the space S, which may also be referred to as a liquid crystal gap.

In the embodiment, the first distance D1 is 6% to 60% of the fourth distance D4, the second distance D2 is less than 6% of the fourth distance D4, and the third distance D3 is less than 6% of the fourth distance D4. In the embodiment, since the thickness of the spacer layer 108 on the first leads 102a is smaller than the thickness of the remaining part of the spacer layer 108, the first distance D1 is greater than the second distance D2 and the third distance D3. In addition, as described above, depending on the thickness of the spacer layer 108 located between two adjacent leads and the thickness of the spacer layer 108 located on the second leads 102b, the third distance D3 may be less than or equal to the second distance D2.

Figure 5A:
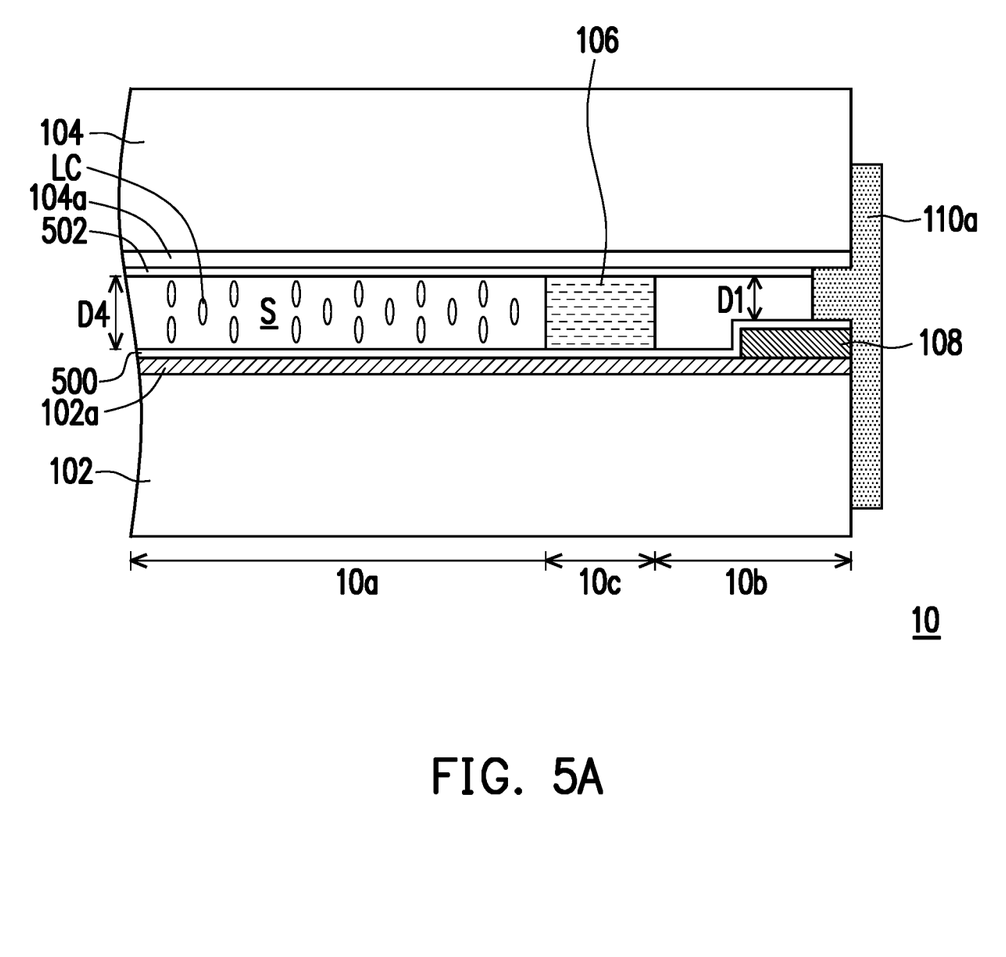
FIG. 5A is a schematic cross-sectional view of the display panel along the section line A-A in FIG. 1 according to another embodiment of the invention.
Figure 5B:
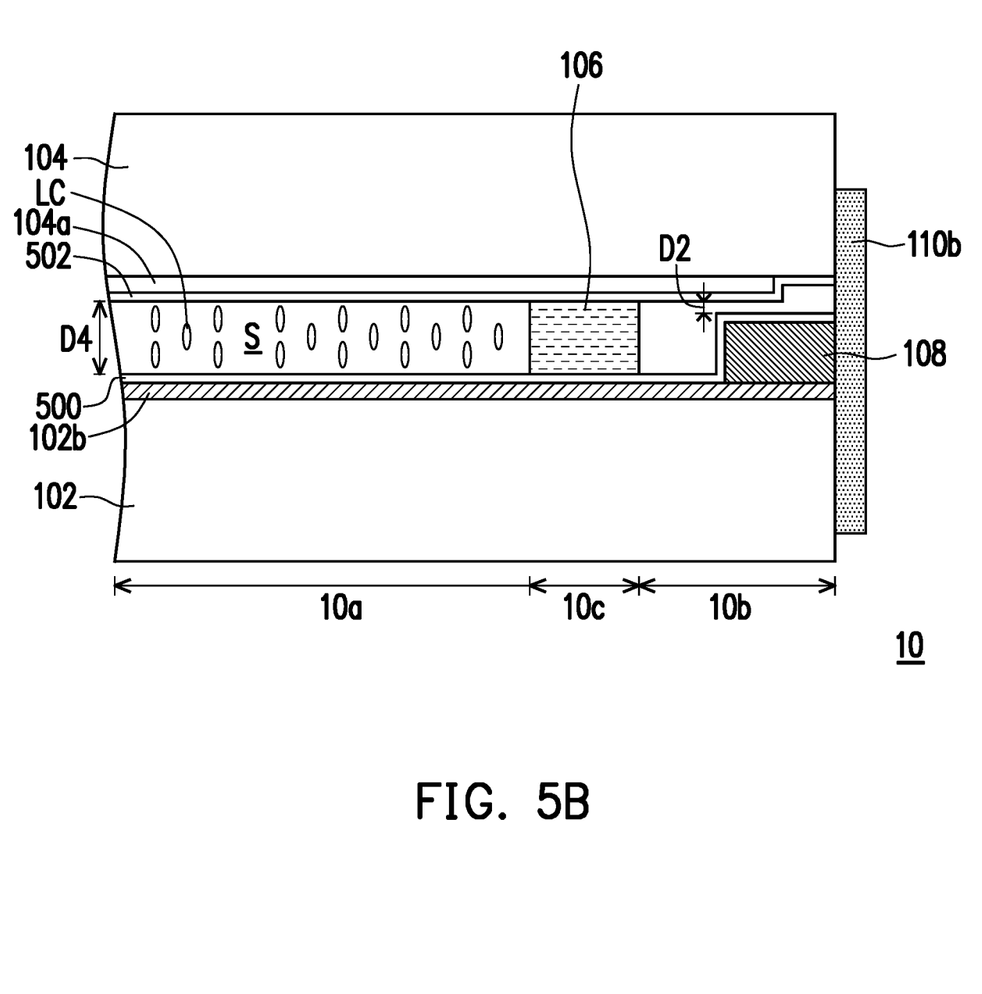
FIG. 5B is a schematic cross-sectional view of the display panel along the section line B-B in FIG. 1 according to another embodiment of the invention.
Figure 5C:
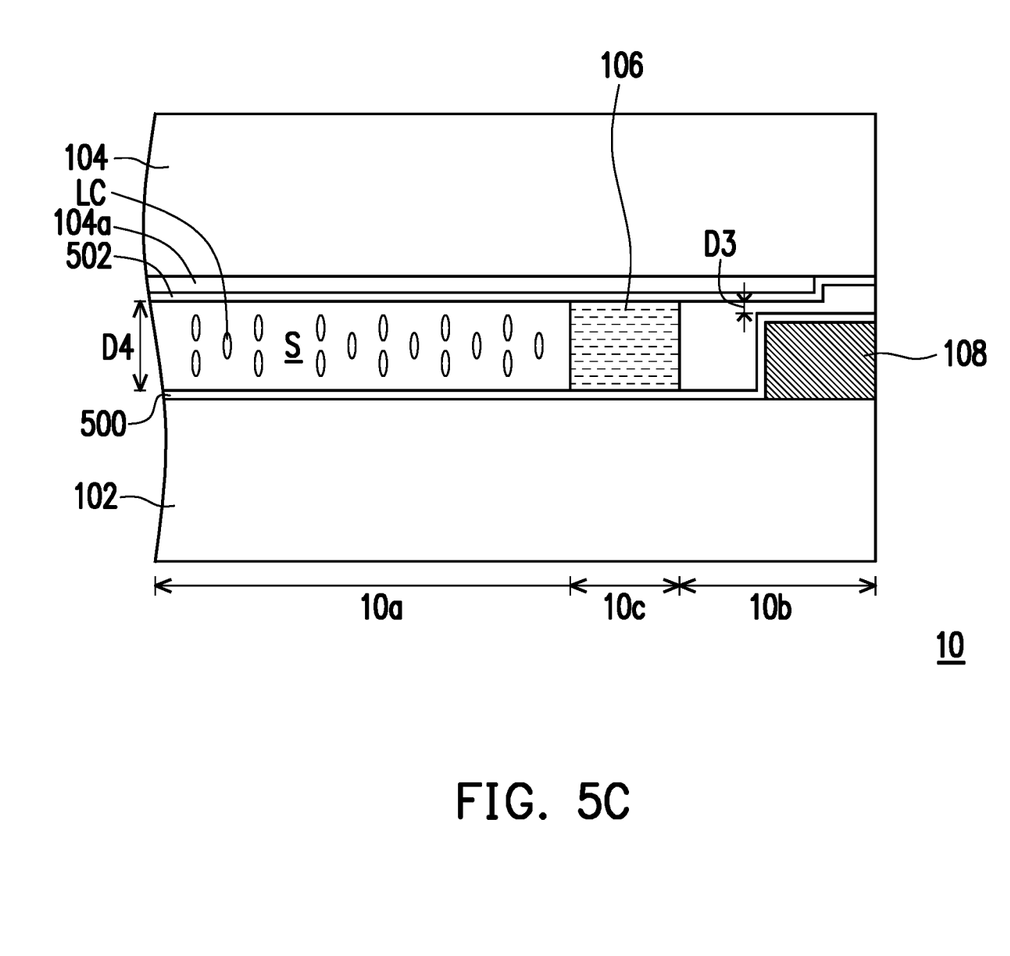
FIG. 5C is a schematic cross-sectional view of the display panel along the section line C-C in FIG. 1 according to another embodiment of the invention.

In addition, in other embodiments, as shown in FIG. 5A, FIG. 5B and FIG. 5C, the display panel 10 may further include a first alignment layer 500 and a second alignment layer 502. The first alignment layer 500 covers the first substrate 102, the first leads 102a, the second leads 102b and the spacer layer 108. The second alignment layer 502 covers the second substrate 104 and the patterned electrode layer 104a, and exposes a part of the patterned electrode layer 104a located above the first pin 102a in the periphery region 10b. Since thicknesses of the first alignment layer 500 and the second alignment layer 502 are quite small compared to the height of the space S, when the first alignment layer 500 and the second alignment layer 502 exist, the first distance D1, the second distance D2, the third distance D3, and the fourth distance D4 may include the thicknesses of the first alignment layer 500 and the second alignment layer 502.

In the embodiment, a material of the first leads 102a and the second leads 102b may be conductive metal, such as copper. The patterned electrode layer 104a may be a transparent electrode, and a material thereof may be indium tin oxide (ITO) or indium zinc oxide (IZO).

Referring back to FIG. 1, FIG. 2A, FIG. 2B and FIG. 2C, a plurality of first conductive pads 110a are disposed at a side of the display panel 10, and are connected to the patterned electrode layer 104a, the first leads 102a, and the spacer layer 108 located on the first leads 102a. In addition, the first conductive pads 110a extend to a space between the patterned electrode layer 104a and the spacer layer 108. Through the first conductive pads 110a, the first leads 102a may be electrically connected to the patterned electrode layer 104a. In addition, since the first conductive pads 110a extend to the space between the patterned electrode layer 104a and the spacer layer 108, a contact area between the first conductive pads 110a and the patterned electrode layer 104a is increased, thereby ensuring the electrical connection between the first leads 102a and the patterned electrode layer 104a. Moreover, since the spacer layer 108 is disposed on the first leads 102a, an amount of the first conductive pads 110a extending to the space between the patterned electrode layer 104a and the spacer layer 108 may be reduced to avoid material waste. Furthermore, since the first distance D1 is 6% to 60% of the fourth distance D4, a situation that the first conductive pads 110a are broken due to the excessive distance between the first leads 102a and the patterned electrode layer 104a to result in none electrical connection between the first leads 102a and the patterned electrode layer 104a is avoided.

In addition, a plurality of second conductive pads 110b are disposed at the side of the display panel 10, and are connected to the second leads 102b and the spacer layer 108 located on the second leads 102b, but are not connected to the patterned electrode layer 104a. In detail, in the embodiment, since the second leads 102b does not need to be electrically connected to the patterned electrode layer 104a, the part of the patterned electrode layer 104a located above the second leads 102b does not extend to the side of the second substrate 104 to be exposed at the side. In this way, the second conductive pads 110b do not contact the patterned electrode layer 104a. In addition, since the second distance D2 is less than 6% of the fourth distance D4, the second conductive pads 110b may be prevented from extending to the space between the patterned electrode layer 104a and the spacer layer 108 during the manufacturing process, so as to further ensure that the second conductive pads 110b do not contact the patterned electrode layer 104a.

In addition, in the region between two adjacent leads, since the third distance D3 is less than 6% of the fourth distance D4, the adjacent first conductive pads 110a and/or the second conductive pads 110b does not extend to the region. In detail, since the third distance D3 is less than 6% of the fourth distance D4, during the manufacturing process of the first conductive pads 110a and the second conductive pads 110b, a conductive pad material may be effectively prevented from entering the above-mentioned region. In this way, the formed conductive pads do not extend into the above-mentioned region, which may avoid waste of materials and avoid short circuits between the adjacent conductive pads.

After the external circuit board is electrically connected to the display panel of the invention, the display device of the invention may be constructed, which will be explained below.

Figure 3A:
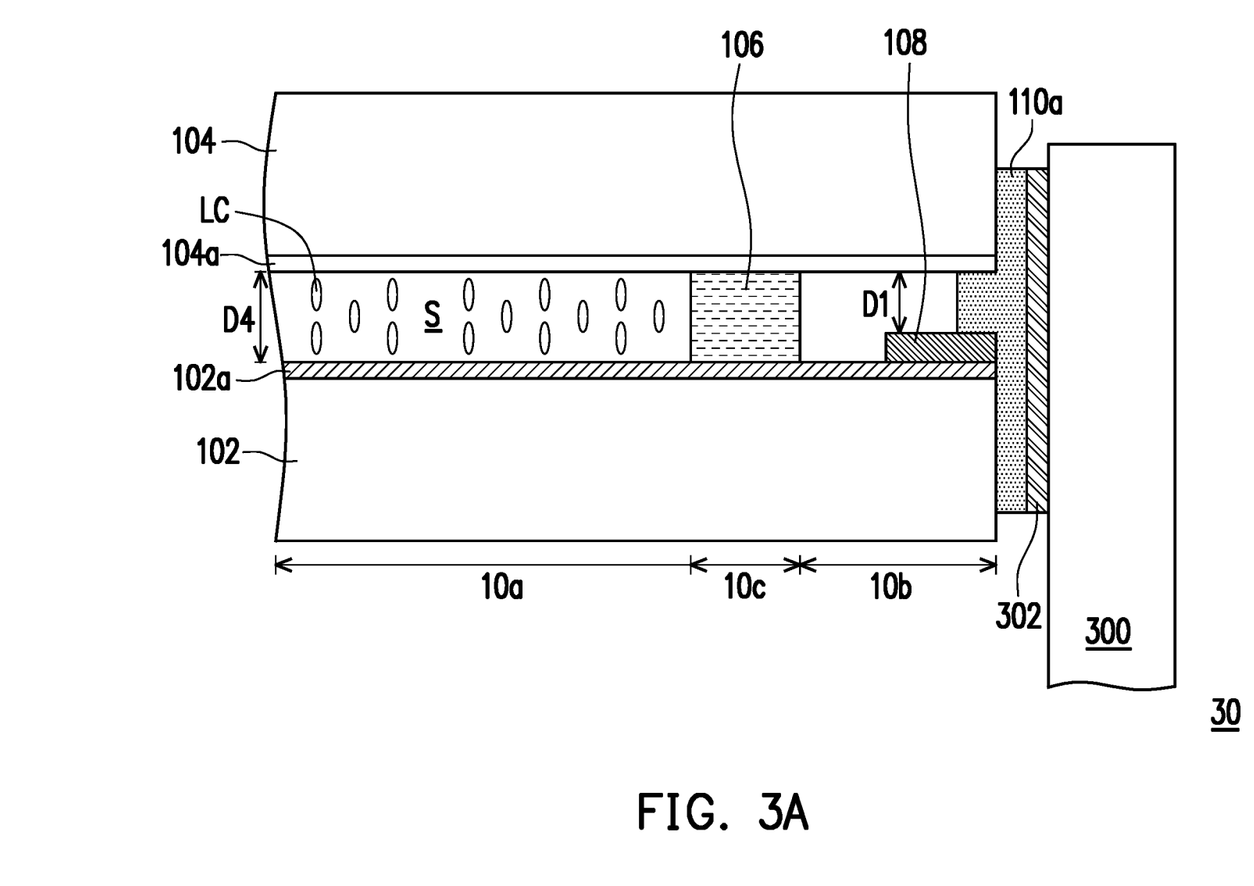
FIG. 3A is a schematic cross-sectional view of a display device along a section line A-A in FIG. 1 according to an embodiment of the invention.
Figure 3B:
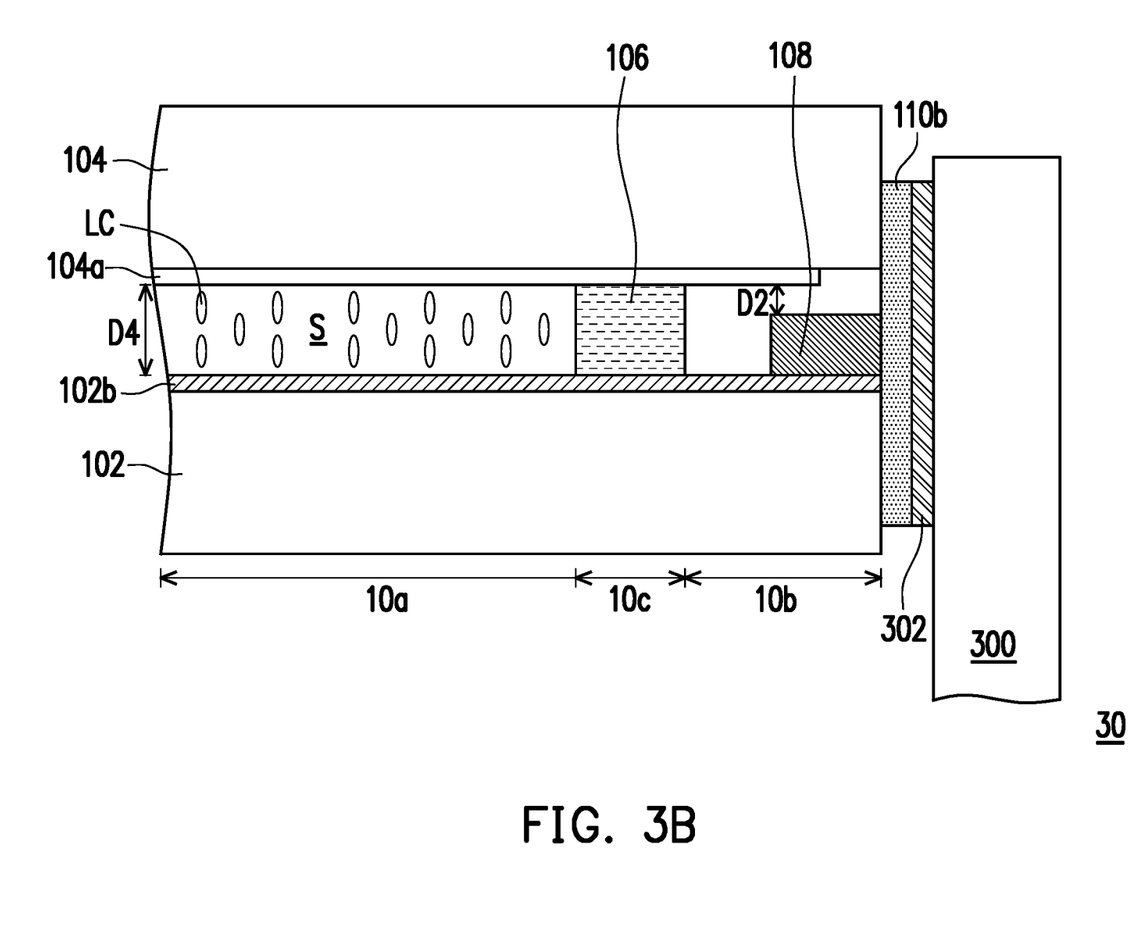
FIG. 3B is a schematic cross-sectional view of the display device along a section line B-B in FIG. 1 according to an embodiment of the invention.
Figure 3C:
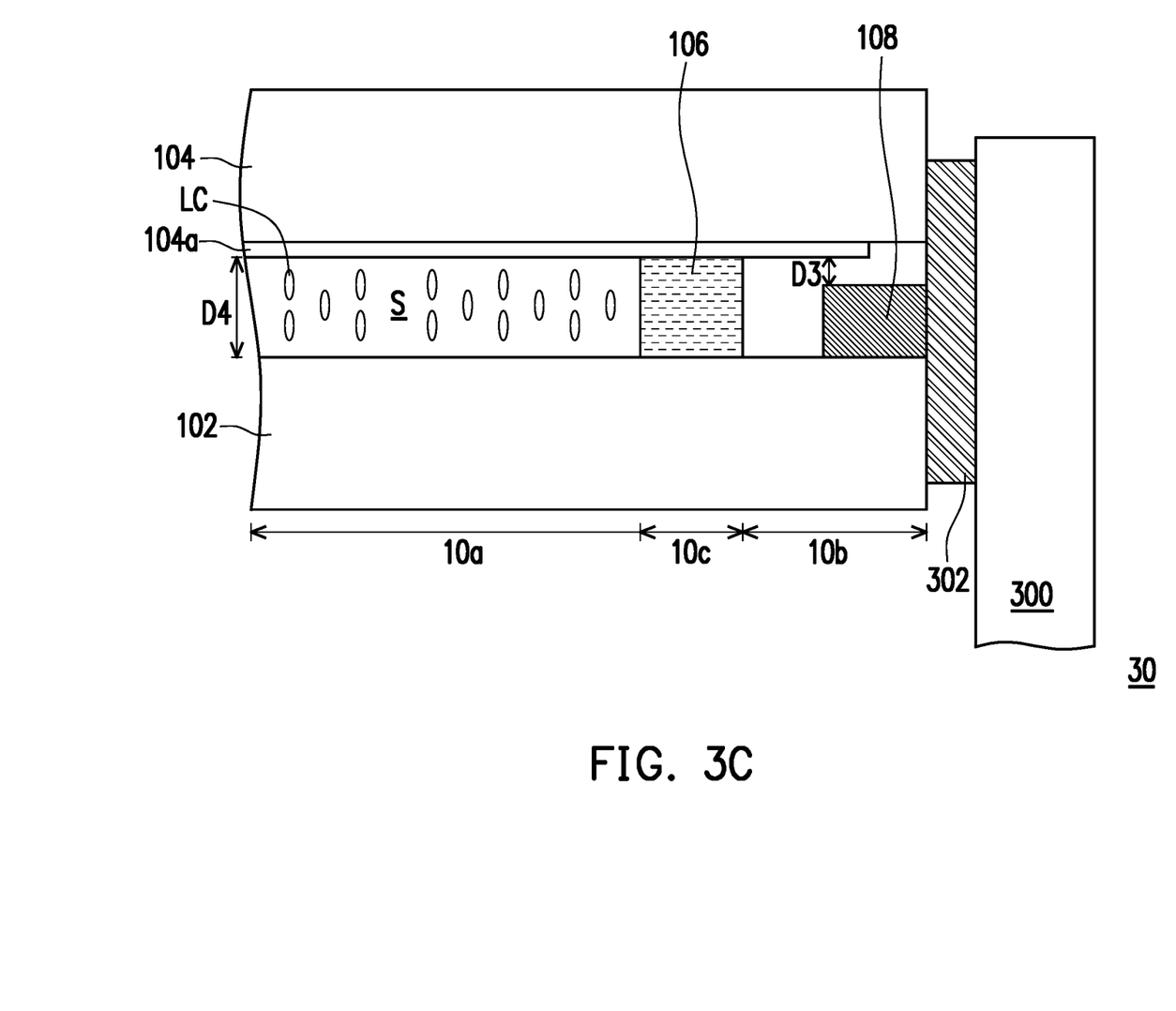
FIG. 3C is a schematic cross-sectional view of the display device along a section line C-C in FIG. 1 according to an embodiment of the invention.

FIG. 3A is a schematic cross-sectional view of a display device along a section line A-A in FIG. 1 according to an embodiment of the invention. FIG. 3B is a schematic cross-sectional view of the display device along a section line B-B in FIG. 1 according to an embodiment of the invention. FIG. 3C is a schematic cross-sectional view of the display device along a section line C-C in FIG. 1 according to an embodiment of the invention. In FIG. 3A, FIG. 3B, and FIG. 3C, the same components as those in FIG. 2A, FIG. 2B, and FIG. 2C are not be described repeatedly.

Referring to FIG. 3A, FIG. 3B and FIG. 3C, in the embodiment, the display device 30 includes a display panel 10, an external circuit board 300 and a conductive adhesive layer 302. The external circuit board 300 mainly includes a substrate, a circuit pattern disposed on the substrate, leads used for connecting with external components, and a chip disposed on the circuit pattern, and these components are well known to those skilled in the art, so that detailed descriptions thereof are not repeated. In addition, in order to make the drawings clear, FIG. 3A, FIG. 3B, and FIG. 3C only briefly illustrate a part of the external circuit board 300, and the above-mentioned components are not illustrated.

Referring to FIG. 3A, FIG. 3B and FIG. 3C at the same time, in the embodiment, the conductive adhesive layer 302 is disposed at the side of the display panel 10 and covers the first conductive pads 110a and the second conductive pads 110b, and the external circuit board 300 is disposed on the conductive adhesive layer 302. The conductive adhesive layer 302 is, for example, a film layer formed by an anisotropic conductive paste (ACP) or an anisotropic conductive film (ACF). The external circuit board 300 may be bonded to and electrically connected to the display panel 10 via the conductive adhesive layer 302. The external circuit board 300 is, for example, a chip on film (COF) substrate. In this way, the display device 30 of the embodiment is constituted. As shown in FIG. 3A, since a contact area between the first conductive pads 110a and the patterned electrode layer 104a is increased, the electrical connection between the first leads 102a and the patterned electrode layer 104a is ensured, thereby ensuring the performance of the display device 30. In addition, as shown in FIG. 3B and FIG. 3C, due to the arrangement of the spacer layer 108, extension of the second conductive pads 110b to contact the patterned electrode layer 104a is effectively avoided, and short circuit between the adjacent conductive pads is avoided, thereby ensuring the performance of the display device 30.

Moreover, as shown in FIG. 3C, in the region between two adjacent conductive pads, since there is no conductive pad, the conductive adhesive layer 302 directly contacts the first substrate 102, the second substrate 104 and the spacer layer 108. In addition, since the third distance D3 is less than 6% of the fourth distance D4, the conductive adhesive layer 302 does not extend into the above-mentioned region, so that a usage amount of the conductive adhesive layer 302 may be reduced, and a problem of short circuit caused by infiltration of the conductive adhesive layer 302 may be avoided.

In addition, in the embodiment of FIG. 5A, FIG. 5B and FIG. 5C, in the embodiment shown in FIG. 5A, FIG. 5B, and FIG. 5C, the first conductive pads 110a are disposed on the side of the display panel 10, and are connected to the patterned electrode layer 104a, the first leads 102a, and the spacer layer 108 located on the first leads 102a. The second alignment layer 502 exposes a part of the patterned electrode layer 104a located above the first leads 102a in the periphery region 10b. Therefore, the first conductive pads 110a extend to a space between the patterned electrode layer 104a and the spacer layer 108, and since the second alignment layer 502 exposes a part of the patterned electrode layer 104a, a contact area between the first conductive pads 110a and the patterned electrode layer 104a is increased, so that the electrical connection between the first leads 102a and the patterned electrode layer 104a may be further ensured. Moreover, since the spacer layer 108 is disposed on the first leads 102a, an amount of the first conductive pads 110a extending to the space between the patterned electrode layer 104a and the spacer layer 108 may be reduced to avoid waste of materials. Furthermore, since the first distance D1 is 6% to 60% of the fourth distance D4, a situation that the first conductive pads 110a are broken due to the excessive distance between the first leads 102a and the patterned electrode layer 104a to result in none electrical connection between the first leads 102a and the patterned electrode layer 104a is avoided.

In addition, since the second distance D2 is less than 6% of the fourth distance D4, the second conductive pads 110b may be prevented from extending to the space between the patterned electrode layer 104a and the spacer layer 108 during the manufacturing process, so as to further ensure that the second conductive pads 110b do not contact the patterned electrode layer 104a.

Moreover, since the third distance D3 is less than 6% of the fourth distance D4, during the manufacturing process of the first conductive pads 110a and the second conductive pads 110b, the conductive pad material may be effectively prevented from entering the above-mentioned region to avoid waste of materials and avoid short circuits between the adjacent conductive pads. In detail, in the manufacturing process of the first conductive pads 110a and the second conductive pads 110b, the material (such as silver glue) of the first conductive pads 110a and the second conductive pads 110b is usually printed on the sides of the display panel 10, and then laser processing is used to remove a part of the material to form the first conductive pads 110a and the second conductive pads 110b. Since the third distance D3 is less than 6% of the fourth distance D4, the printed material will not enter the above-mentioned area, which avoids material waste and the short circuit problem.

Figure 4A:
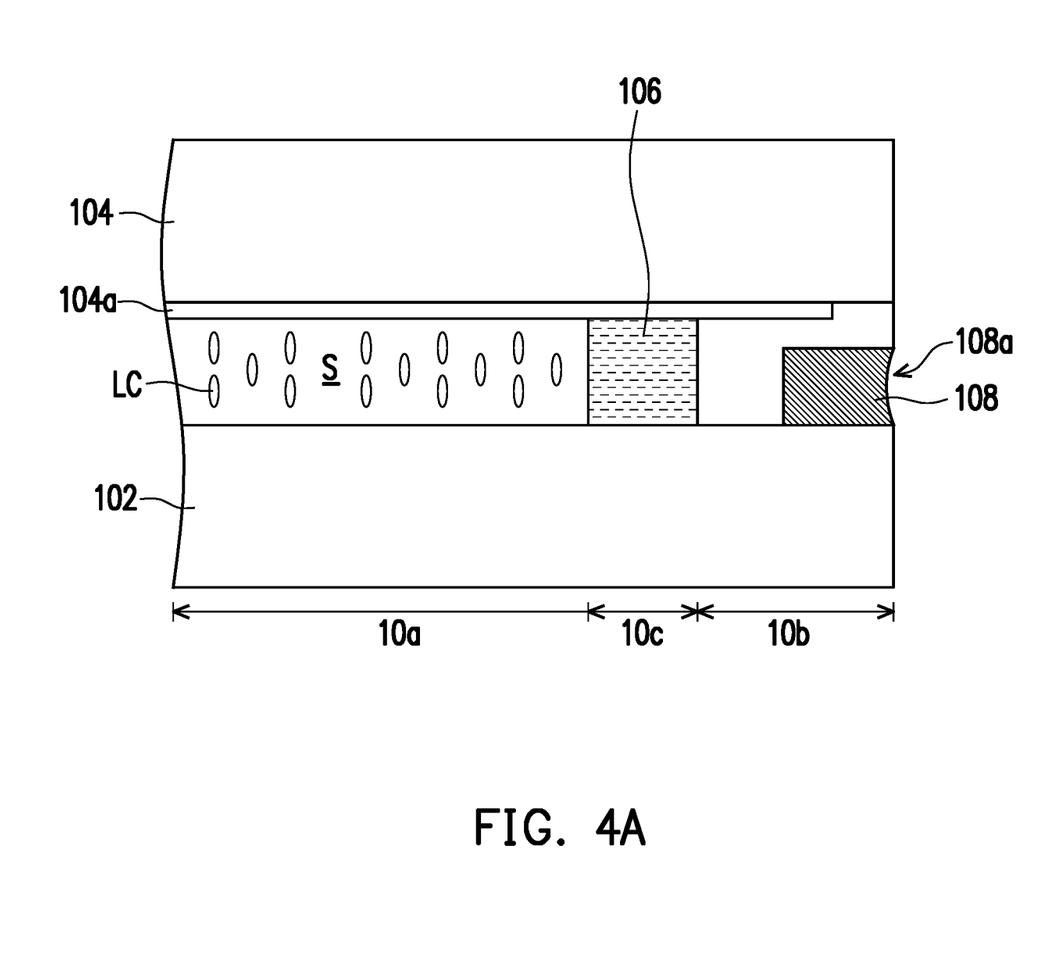
FIG. 4A and FIG. 4B are respectively a schematic cross-sectional view of the display device along the section line C-C in FIG. 1 according to another embodiment of the invention.
Figure 4B:
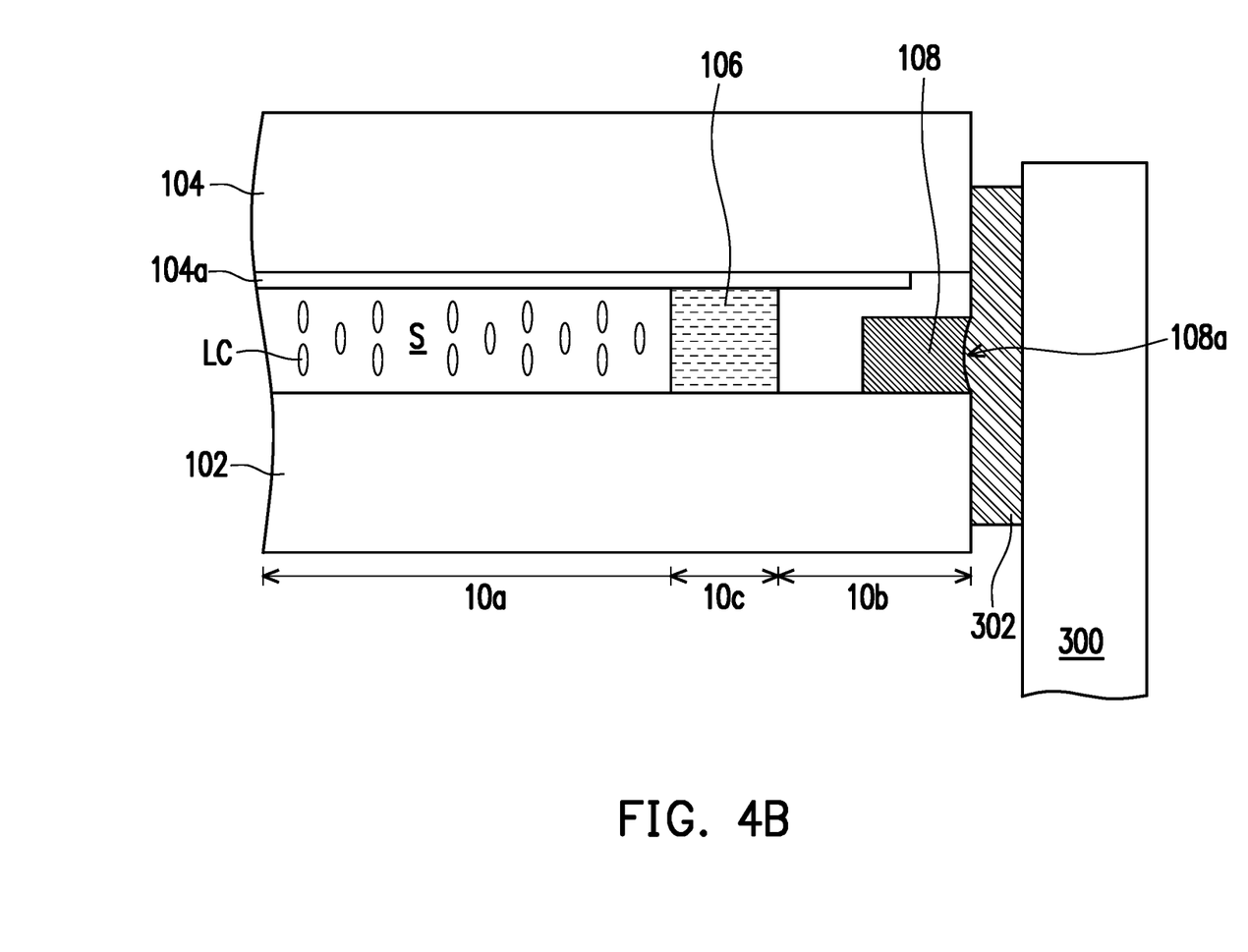

In the above embodiment, the spacer layer 108 in the region between two adjacent leads has a flat sidewall, as shown in FIG. 2C and FIG. 3C, but the invention is not limited thereto. In other embodiments, the sidewall of the spacer layer 108 in the region between two adjacent leads may have a recess 108a (as shown in FIG. 4A), and after the external circuit board 300 is connected to the display panel 10 through the conductive adhesive layer 302, the conductive adhesive layer 302 may extend into the recess 108a (as shown in FIG. 4B). In this way, a bonding strength between the external circuit board 300 and the display panel 10 may be further increased.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:
1. A display device, comprising:
a display panel, having a central region and a periphery region, and comprising:
a first substrate, wherein a plurality of first leads and a plurality of second leads are disposed on the first substrate and extend to the periphery region, and are exposed at a side of the first substrate;

a second substrate arranged opposite to the first substrate, wherein a patterned electrode layer is disposed on the second substrate and is partially exposed at a side of the second substrate;

a sealant, disposed between the first substrate and the second substrate; and a spacer layer, disposed on the first substrate and located in the periphery region, and covering the first leads and the second leads, wherein a thickness of the spacer layer on the first leads is smaller than a thickness of a remaining part of the spacer layer;

a plurality of first conductive pads, disposed at a side of the display panel, and connecting the patterned electrode layer, the first leads, and the spacer layer on the first leads, wherein the first conductive pads extend to a space between the patterned electrode layer and the spacer layer on the first leads;

a plurality of second conductive pads, disposed at the side of the display panel, and connecting the second leads and the spacer layer on the second leads;

a conductive adhesive layer, disposed at the side of the display panel and covering the first conductive pads and the second conductive pads; and an external circuit board, arranged on the conductive adhesive layer.

2. The display device as claimed in claim 1, wherein there is a first distance between the spacer layer on the first lead and the patterned electrode layer, there is a second distance between the spacer layer on the second lead and the patterned electrode layer, there is a third distance between the spacer layer on the first substrate and the patterned electrode layer located between two adjacent leads, and there is a fourth distance from the first lead and the second lead to the patterned electrode layer in the central region, wherein the first distance is greater than the second distance and the third distance.

3. The display device as claimed in claim 2, wherein the first distance is 6% to 60% of the fourth distance.

4. The display device as claimed in claim 2, wherein the second distance is less than 6% of the fourth distance.

5. The display device as claimed in claim 2, wherein the third distance is less than 6% of the fourth distance.

6. The display device as claimed in claim 2, wherein the third distance is less than or equal to the second distance.

7. The display device as claimed in claim 1, wherein a surface of the spacer layer on the first substrate between the first lead and the second lead is exposed at the side of the display panel and has a recess, and a part of the conductive adhesive layer is located in the recess.

8. The display device as claimed in claim 1, further comprising a first alignment layer covering the first substrate, the first leads, the second leads and the spacer layer.

9. The display device as claimed in claim 1, further comprising a second alignment layer, covering the second substrate and the patterned electrode layer, and exposing a part of the patterned electrode layer located above the first lead in the periphery region.

* * * * *